United States Patent [19]
Burns et al.

[11] Patent Number: 6,095,298
[45] Date of Patent: Aug. 1, 2000

[54] WET CLUTCH/BRAKE FOR A MECHANICAL PRESS

[75] Inventors: Bradley A. Burns, Wapakoneta; Edward A. Daniel, Fort Loramie; John B. Bornhorst, New Bremen; Russell W. Palmer, Celina; Kevin J. Evers, Fort Recovery, all of Ohio

[73] Assignee: The Minster Machine Company, Minster, Ohio

[21] Appl. No.: 09/181,447

[22] Filed: Oct. 28, 1998

Related U.S. Application Data

[60] Provisional application No. 60/084,604, May 7, 1998.

[51] Int. Cl.⁷ .................................................. F16D 67/04
[52] U.S. Cl. .................. 192/18 A; 192/12 C; 192/113.34
[58] Field of Search ................................ 192/18 R, 18 A, 192/12 C, 70.12, 113.34

[56] References Cited

U.S. PATENT DOCUMENTS

| | | |
|---|---|---|
| 4,552,255 | 11/1985 | Sommer . |
| 5,190,129 | 3/1993 | Sommer . |
| 5,487,456 | 1/1996 | Sommer ................................ 192/18 A |
| 5,573,092 | 11/1996 | Gabilondo ............................ 192/18 A |
| 5,577,581 | 11/1996 | Eberwein et al. .................... 192/18 A |
| 5,651,436 | 7/1997 | Sommer ........................... 192/18 A X |
| 5,657,843 | 8/1997 | Sommer ................................ 192/18 A |
| 5,680,915 | 10/1997 | Sommer ........................... 192/18 A X |
| 5,697,862 | 12/1997 | Sommer ........................... 192/18 A X |
| 5,769,187 | 6/1998 | Sommer ........................... 192/18 A X |
| 5,806,641 | 9/1998 | Sommer ................................ 192/18 A |

FOREIGN PATENT DOCUMENTS

| | | |
|---|---|---|
| 2 115 512 | 9/1983 | United Kingdom . |
| 2115512 | 9/1983 | United Kingdom . |
| 2314601 | 7/1998 | United Kingdom . |
| WO 95/31651 | 11/1995 | WIPO . |
| WO 96/01957 | 1/1996 | WIPO . |
| WO 97/09451 | 3/1997 | WIPO . |

OTHER PUBLICATIONS

Airflex DCB Clutch/Brake, Eaton Corporation, 1990. (2 pages).

*Primary Examiner*—Rodney H. Bonck
*Assistant Examiner*—Saúl J. Rodriguez
*Attorney, Agent, or Firm*—Randall J. Knuth

[57] ABSTRACT

A mechanical press having a wet or oil shear clutch/brake drive unit is provided including elimination of undamped clearances. Lubrication oil utilized in the press flywheel bearing is ported and communicated into the clutch brake unit for use therein, eliminating the use of two separate lubrication or oil transport systems. A hydrostatic oil bearing on the brake/clutch actuator member (actuation plate) eliminates the use or need of an anti-friction bearing between the actuator member and the brake and clutch members.

19 Claims, 4 Drawing Sheets

WET CLUTCH/BRAKE FOR A MECHANICAL PRESS

This application claims benefit to U.S. provisional application Ser. No. 60/084,604, filed May 7, 1998.

BACKGROUND OF THE INVENTION

1. Field of the Invention

The present invention relates to a mechanical press drive. More particularly, the present invention relates to a wet or oil shear clutch/brake unit utilizing oil films to eliminate free undamped clearances.

2. Description of the Related Art

Prior wet clutch/brake systems have been used in mechanical presses since they offer the advantage of little or no wear on the plates of the disk stacks and no brake fade. This provides a precise operation of the press and dramatically increases press run time. Furthermore, utilization of multiple disks in a disk stack can be used to greatly reduce the clutch/brake inertia, thereby allowing the mechanical interlocking of clutch and brake without inertia penalty. In addition, the multiple disk surfaces provide precise inching capability.

Particular problems of current wet clutch/brake designs are the utilization of undamped clearances between particular parts. Such undamped clearances create locations of possible wear, such as at clutch drive disks, driven disks, and drive pins.

Other designs of wet clutch/brake units utilize anti-friction thrust bearing to contain or control movement of the actuation plate or piston.

The primary apparatus for storing mechanical energy within a press is a flywheel. The flywheel is usually mounted on one end of the crankshaft and connected by a belt to the output pulley of the motor, such that when the motor is energized, the mass of flywheel rotates continuously. The flywheel and flywheel bearing are normally axially mounted near the drive shaft, crankshaft, or the press frame by use of the quill. The main drive motor replenishes the energy that is lost or transferred from the flywheel during press operations when the clutch engages the flywheel to rotate rotary motion of the flywheel to the crankshaft. During engagement of the clutch, the flywheel drops in speed as the press driven parts are brought up to press running speed.

Additionally, heretofore the lubrication oil utilized within the flywheel bearings, which connect to the flywheel, have used different lubrication oil from that of the friction disks utilized within the clutch/brake unit.

SUMMARY OF THE INVENTION

According to the present invention, a mechanical press having a wet or oil shear clutch/brake drive unit is provided. Features of the present clutch brake unit include elimination of undamped clearances, particularly in the clutch assembly, i.e., clutch drive disks and driven disks, along with portions of the brake or actuator assembly. Elimination of undamped free clearance between all other clutch brake unit members is also created. Such elimination of undamped free clearance increases the operation life of the unit components.

Further, lubrication oil utilized in the press flywheel bearing is ported and communicated into the clutch brake unit for use therein. This creates a substantial savings by preventing the use of two separate lubrication or oil transport systems.

The invention also includes the use of a hydrostatic oil bearing on the brake/clutch actuator member (actuation plate) which eliminates the use or need of an anti-friction bearing between the actuator member and the brake and clutch members.

The invention, in one form thereof, is a press in combination with an oil shear clutch brake unit, the press including a shaft and flywheel with an oil filled bearing. The oil clutch brake unit includes support means for anchoring the clutch brake unit to a rotatable member of the press, and input means for receiving rotary motion from the flywheel. The input means is rotatable with respect to the support means, and disposed in coaxially spaced relation thereabout. An output means is used for transmitting rotary motion from the clutch brake unit to the press shaft. Selectively operable clutch means are included for transmitting rotation motion from the input means to the output means. Selectively operable brake means are also included for prohibiting rotation to said output means from said input means, the brake means including a plurality of interleaved friction disks able to stop rotation of the press shaft. The oil filled flywheel bearing drains oil into the clutch brake unit to lubricate the clutch means.

The invention in another form thereof, comprises a press in combination with an oil shear clutch brake unit. The press includes a shaft and flywheel with an oil filled bearing. The oil clutch brake unit comprises a support means for anchoring the clutch brake unit to a rotatable member of the press. The rotatable member of the press has an input means for receiving rotary motion from the flywheel in which the input means is rotatable with respect to the support means, and disposed in coaxially spaced relation thereabout. In addition, there is an output means for transmitting rotary motion from the clutch brake unit to the press shaft. A selectively operable clutch means for transmitting rotation motion from the input means to the output means, in which the clutch means includes a plurality of interleaved friction disks, a selectively operable brake means for prohibiting rotation to the output means from the input means, in which the brake means includes a plurality of interleaved friction disks able to stop rotation of the press shaft, and an oil film creation means to lubricate the clutch means and substantially eliminate free undamped clearances within the clutch means is also found within the oil clutch brake unit. Alternatively, the creation of an oil level and oil films with the clutch brake unit during operation may eliminate free undamped clearances on substantially all clutch brake unit components.

The invention in another form, includes a press with a shaft and flywheel with an oil filled bearing in combination with an oil shear clutch brake unit. The oil clutch brake unit comprises a support means for anchoring the clutch brake unit to a rotatable member of the press, and an input means for receiving rotary motion from the flywheel. The input means is rotatable with respect to the support means, and disposed in coaxially spaced relation thereabout. An output means for transmitting rotary motion from the clutch brake unit to the press shaft is included. A selectively operable clutch means for transmitting rotation motion from the input means to the output means, selectively operable brake means for prohibiting rotation to the output means from the input means, and the brake means including a plurality of interleaved friction disks able to stop rotation of the press shaft is also included in an oil clutch brake. In addition, a slidable actuator plate located between the clutch means and brake means, the sliding of the actuator plate actuating either of the brake means or the clutch means and a hydrostatic oil type bearing located on the actuator plate opposite at least one of the brake means and the clutch means is included.

An advantage of the present invention is the use of oil films, or partial or total immersion of the clutch and/or brake component in an oil bath during operation, which prevents free undamped clearances. With the elimination of free undamped clearance enhanced operation results. Additionally, use of the oil films by oil immersion may reduce potential backlash. Clearance spaces previously not oil filled subjected the bearings and other parts to increase impact loads causing premature failure of such parts.

Another advantage of the present invention, is that the utilization of the same oil between the flywheel bearing and use within the clutch/brake unit. By utilizing the same type of oil, the number of different oils used within the mechanical press is reduced. Additionally, oil communication and transport including the pumping arrangement are simplified and/or eliminated.

A further advantage of the invention is the use of hydrostatic oil type bearings on the clutch/brake unit, actuator plate, and on the flywheel bearings. Hydrostatic bearings have the ability to support hydrostatically as well as dynamically, while creating a high value of stiffness to positively locate load carrying members. With such bearings, no metal to metal contact occurs, thereby eliminating wear.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
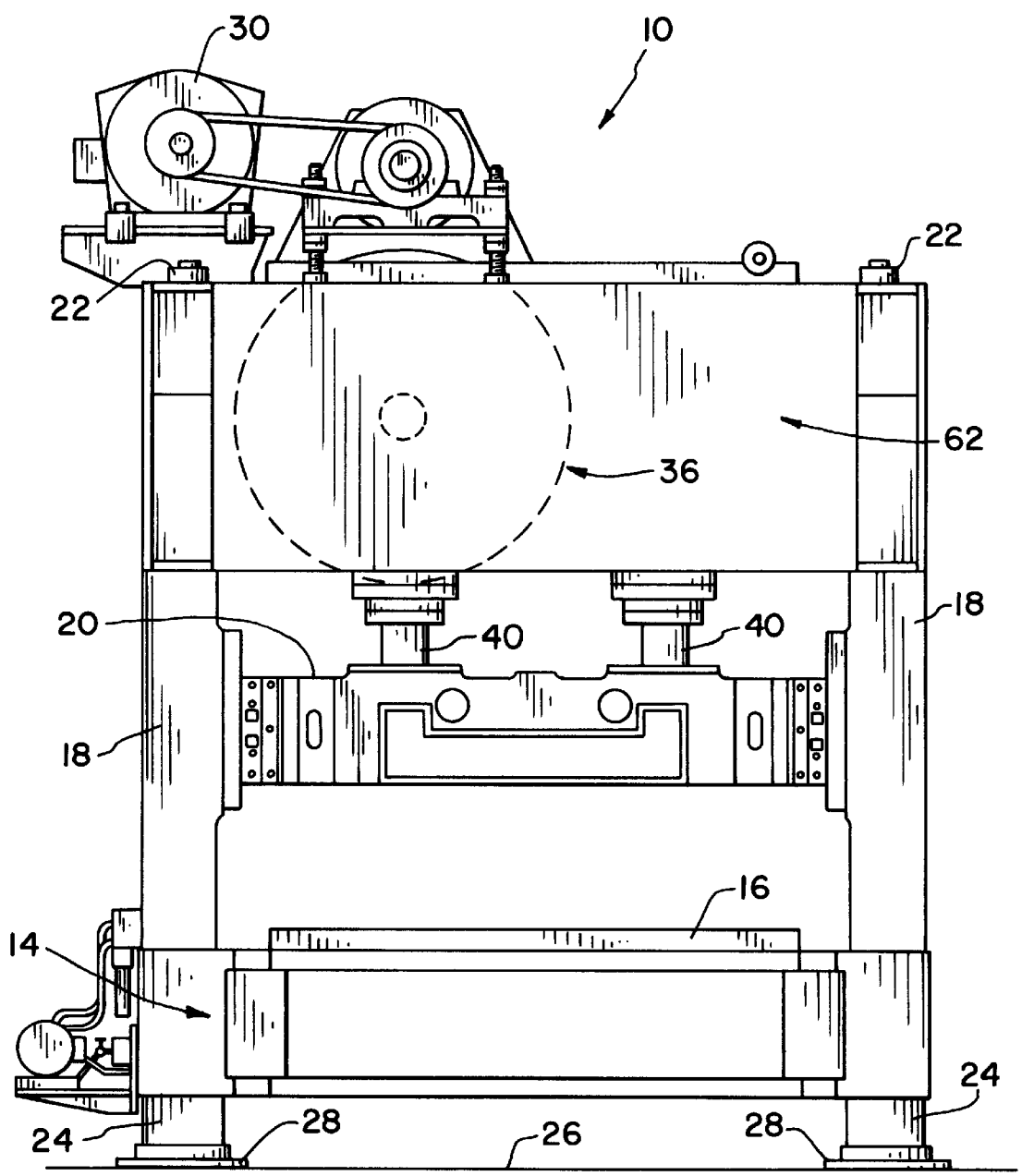
FIG. 1 is a elevational view of a mechanical press.

Referring now to the FIG. 1, there is shown a front elevation view of a press machine incorporating the present invention. Mechanical press 10 comprises a crown assembly, such as crown 12, a bed assembly, such as bed 14 having a bolster assembly 16 connected thereto and uprights 18 connecting crown 12 with bed 14. Uprights 18 are connected to or integral with the underside of crown 12 and the upper side of bed 14. Tie rods (not shown) extend through crown 12, uprights 18 and bed portion 14 and are attached on each end with tie rod nuts 22. A slide 20 is located about bed 14 and between uprights 18. Leg members 24 are formed as an extension of bed 14 and are generally mounted on the shop floor 26 by means of shock absorbing pads 28.

A drive mechanism, such as a press drive motor 30 is attached to crown 12 of press 10 and connected through a flywheel 32 to a clutch/brake mechanism 36 (FIGS. 2, 3) to a shaft or crankshaft 38 (FIGS. 2, 3) to connecting rods 40. A slide 20 is operatively connected to connecting rods 40.

During operation, drive motor 30 rotates shaft 38 which operates the eccentrically connected connecting rods 40 to cause slide 20 to reciprocate in rectilinear fashion toward and away from bed 14.

Figure 2:
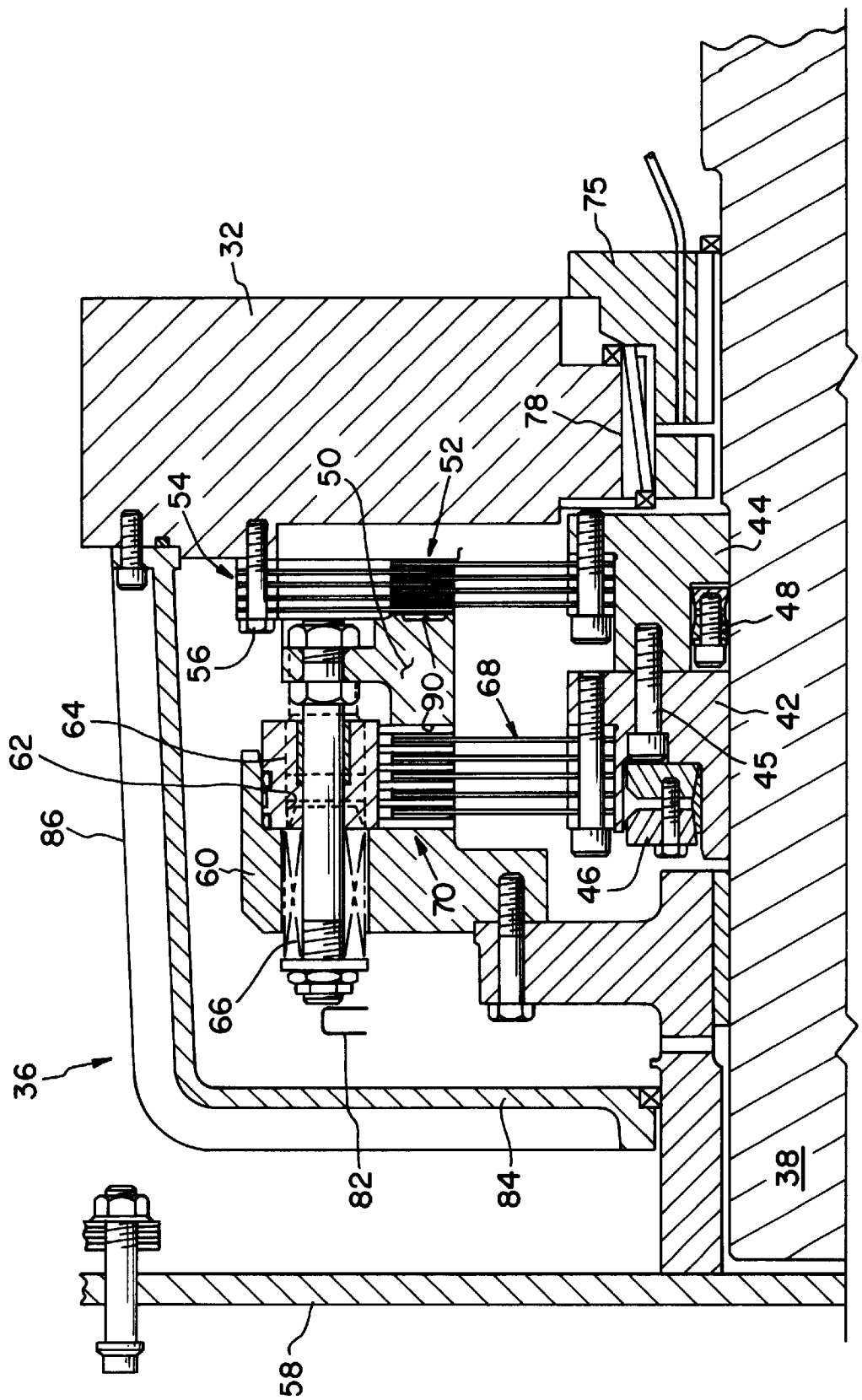
FIG. 2 is a sectional view of one form of the present invention of the clutch/brake unit.

Referring now to FIG. 2, there is shown a fragmentary cross-sectional side view of the press of FIG. 1. Press shaft 38 is rotatable supported within crown portion 12 and extends in an axial direction. As is conventional, the portion (not shown) of shaft 38 further inward or to the right of FIG. 1, is connected to slide 20 by connecting rods to cause rotational energy of shaft 38 to be converted into reciprocating movement of slide 20. Proximate to its outer and/or its left hand in FIG. 2, shaft 38 has an axially mounted combination wet clutch/brake 36 which selectively allows for driving a connection of shaft 38 with a rotating flywheel 32 as well as for braking of shaft rotation. While illustrative of one type of clutch assembly and brake assembly suitable for use in the present invention, the described configuration and/or combination of clutch/brake unit 36 is not intended to be limiting as other assemblies may be used within the scope of the invention. In particular, other possible locations of the brake unit or clutch unit within the assembly is possible either radially or axially.

In the shown embodiment (FIG. 2), combination clutch/brake unit 36 includes a piston housing 42 and clutch sleeve 44 which are connected together with bolts 45 and mounted axially on shaft 38. An external shaft clamping device, such as an external shrink disc or ringfeder clamps piston housing 42 onto crankshaft to be rotatable therewith, and internal shaft clamping device 48 expands during installation to similarly lock clutch sleeve 44 to shaft 38 to prevent relative rotation therebetween.

A clutch means is disposed outward of piston housing 42 and circumferentially around clutch sleeve 44 is an annularly shaped actuator plate 50. Connected by bolts along the outer peripheral of the outward surface of clutch sleeve 44 are multiple, circular segment facing elements 52 are arranged in a ring shape. Along the inner periphery of the inward facing actuator plate 50 and connected by bolts to flywheel 32 is a ring shape of clutch facings 54. Actuator plate 50 functions within the clutch assembly to connect or engage facing elements 52 as a driven disk to clutch facings 54. Clutch facings 54 may be retained by bolts 56, one of which is shown in FIG. 2. Attached to the outward face of stud plate 50 is an actuator piston 64 which slidable fits within actuator cylinder 62 of support member 60.

Pressurized hydraulic fluid from a source on the press is routed through a brake restraint 58 and through a support member 60 containing an actuator cylinder 62 holding an actuator piston 64. Actuator piston 64 is attached to actuator plate 50 for movement thereof. When sufficient hydraulic pressure is supplied to combination clutch/brake unit 36 it acts as a clutch and a clutch assembly of this embodiment forms as follows. Due to the hydraulic pressure provided, piston 64 is driven inward (right on FIG. 2) thereby causing actuator plate 50 to be shifted axially inward such that the clutch facings 54 frictionally engage driven disk facings 52. When engaged, driven disk facings 52 are pushed axially inward as will be further explained below, such that the clutch facings 54 (i.e., drive disk assembly) frictionally engage driven disk facings 52 bolted to an annular shoulder of clutch sleeve 44. Frictional connection of driven disk facings 52 between clutch facings 54 results in a transfer of torque from flywheel 32 to clutch sleeve 44 to thereby rotate shaft 38.

The brake components of combinations clutch/brake 36, which serve to selectively stop rotation of shaft 38, include a multiple brake spring set assembly 66 at spaced angular intervals which axially extend through support 60. Spring assembly 66 includes studs (FIG. 2), which are fixedly connected to actuator plate 50 and biased outward by coil springs. Such springs are designed to axially move actuator plate 50 such that brake facing elements 68 contact non-rotation brake disk pack 70 when hydraulic pressure in cylinder 62 is reduced to disengage the clutch assembly. In a manner not shown, although well known in the art, brake disk pack 70 is keyed to crown 12 of press 10, so as to be axially slidable, but rotatably fixed as by brake restraint 58. As a result, when frictionally engaged by actuation plate 50, facings elements 68, and brake disk pack 70 compress. The gripping or clamping of brake disk pack 70 and brake facing elements 68 thereby accomplishes the braking function of the shown assembly.

Attached to flywheel 32 is a rigid clutch plate or drive disk 54 frictionally engagable by the clutch assembly of combination clutch/brake 36. Drive disk 54 is fixedly connected to flywheel 32 by multiple bolts 56 circumferentially spaced around the disk outer periphery. Not shown in the drawings, flywheel 32 may be attached to the drive mechanism by means of a belt (not shown) and rotatable upon a stationary quill 75 via a bearing 78. Shaft 38 may extend axially through the quill 75, and is rotatable relative to thereto. Quill 75 is bolted to the press frame as is conventional. In some embodiments shaft 40 may be termed a driveshaft or crankshaft, but in either manner supplies rotational inertia to other portions of press 10.

Figure 3:
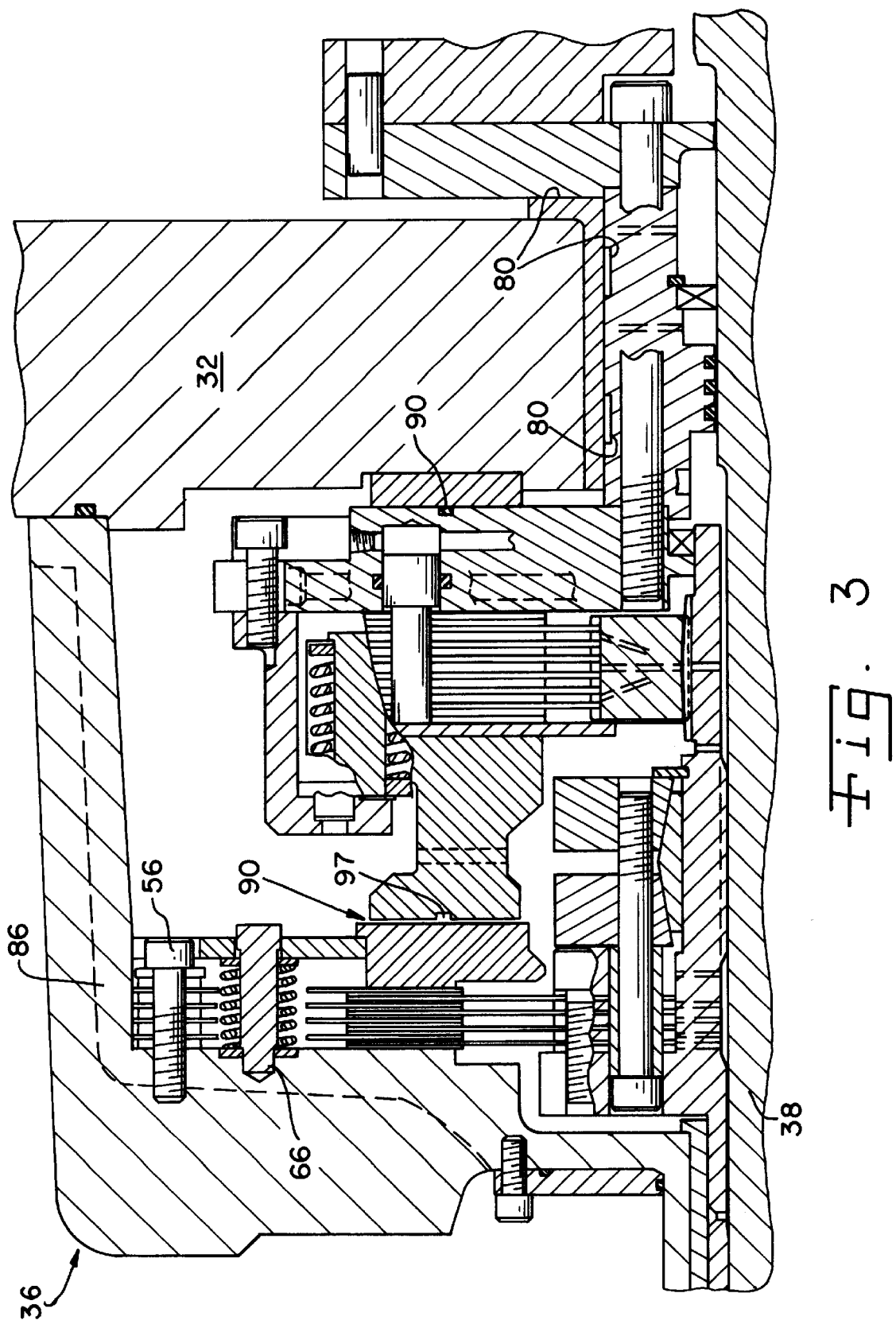
FIG. 3 is a sectional view of another embodiment of the clutch/brake unit.

Particular arrangements between a flywheel 32 and quill 75 may use hydrostatic bearings for the balance of axial forces (FIG. 3). Multiple hydrostatic bearing pads may be formed on the cylindrical exterior surfaces of quill 75 and are supplied with oil conduits (not shown). Hydrostatic bearing pads 80 provide sufficient lubrication and load supporting characteristic to allow relative rotation between flywheel 32 and quill 75. Other flywheel bearings 78 (FIG. 1) may also be utilized between quill 75 and flywheel 32.

The present invention also relates to the use of porting oil utilized for lubrication on the flywheel bearing 78, 80 into the friction disks (52, 54) of the clutch/brake assembly 36. The present invention relates to the use of first utilizing lubricating oil to flood the flywheel bearings (78 or 80) or as previously discussed create the hydrostatic pad areas to be formed between the flywheel 32 and quill 75 assembly. Oil utilized for such structure will then exit toward an interior area within clutch/brake assembly 36.

Wet clutch type brake system of the present invention utilizes an oil scooper 82 to maintain a particular oil level within the clutch brake unit 36 during operation. As the outer housing 84 rotates with flywheel 32, oil and other material with the clutch brake unit 36 will be thrown rotationally outward, or in FIG. 2, upward. Such oil either intentionally supplied into clutch brake unit 36 or coming from flywheel bearing 78, 80 will coat particular clutch/brake unit elements with an oil film to thereby eliminate free undamped clearances therebetween. Of particular importance is the use of such lubricating oil to fill in the clearances indicated in the clutch assembly, and particularly about the bolt or drive pin 56. Depending upon the location of oil scooper 82, the size of clutch assembly and other dimensional sizes, such clutch assembly including clutch facings 54 may be disposed in oil. Such oil level is limited by the location of oil scooper 82 or by simply the oil level. In any event, clearance spaces between elements will be damped with an intentionally created oil film. Housing 84 includes an upper finned portion 86 for increased heat dissipation from clutch/brake unit 36.

Particular embodiments of clutch brake unit 36 includes other locations which may create concern of eliminating free undamped clearances. The present invention substantially eliminates undamped clearances on all rotating and axially moving parts.

Another feature of the present invention, is that of hydrostatic thrust bearings 90 located upon opposite sides of the actuation plate 50. Such use of hydrostatic thrust bearings 90 provide a number of different advantages. First, the present embodiment (FIG. 2) eliminates the use of anti-friction bearings such as tapered roller or ball bearings used in prior art clutch designs. The undamped free clearance in dampened by a controlled film of oil. Anti-friction bearings require a clearance. The same clearance subjects the bearing to increased impact loads that may cause premature failure of the bearing. Properly designed, quality lubrication oil is adequately supplied by an oil supply (not shown) to the hydrostatic thrust bearings.

Figure 4:
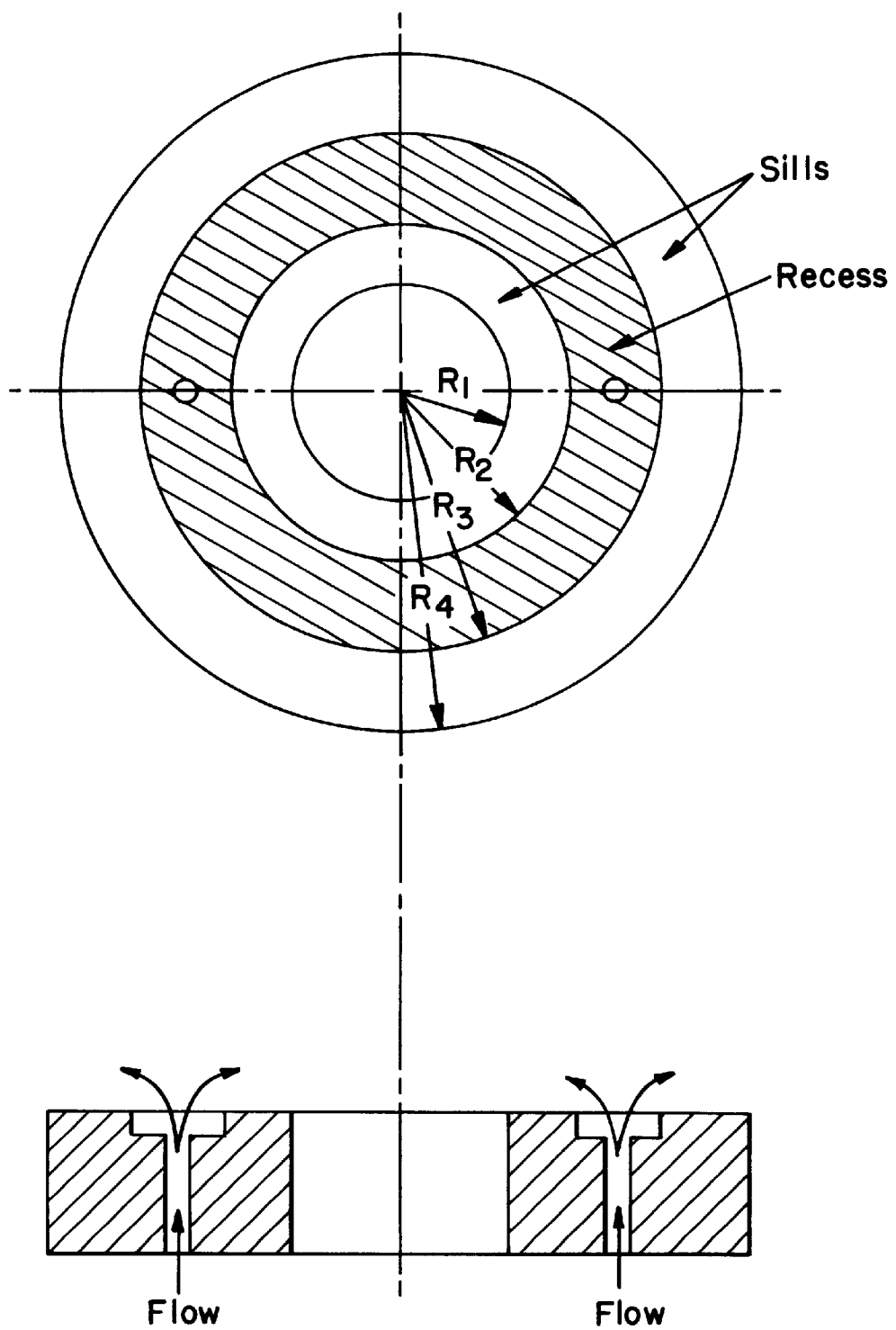
FIG. 4 is a sectional view of an annular hydrostatic thrust pad bearing.

FIG. 4 discloses one possible structure for an annular hydrostatic thrust pad bearing in which lubrication flows from an annular recess over inner and outer sills. As shown in FIG. 3, the actuator plate includes such a recess 97.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press in combination with an oil shear clutch brake unit, said press including a shaft and flywheel with an oil filled bearing, said oil clutch brake unit comprising:

support means for supporting said clutch brake unit within said press;

input means for receiving rotary motion from said flywheel, said input means rotatable with respect to said support means;

output means for transmitting rotary motion from said clutch brake unit to said press shaft;

selectively operable clutch means for transmitting rotary motion from said input means to said output means;

selectively operable brake means for applying a braking action to said output means to inhibit rotary motion of said press shaft, said brake means including a plurality of interleaved friction disks; and first means for enabling fluid communication between said flywheel bearing and at least said clutch means to allow oil present within said flywheel bearing to access at least said clutch means.

2. The press as recited in claim 1, further comprising:

a slidable actuator plate disposed between said clutch means and said brake means, the operative sliding of said actuator plate selectively actuating one of said clutch means and said brake means; and at least one hydrostatic fluid bearing each disposed at a respective side of said actuator plate in facing opposition to at least one of said clutch means and said brake means.

3. The press as recited in claim 1, further comprising:

second means for selectively introducing fluid into said clutch brake unit to lubricate at least said clutch means, said second means being operable independently of said first means.

4. A press in combination with an oil shear clutch brake unit, said press including a shaft and flywheel with an oil filled bearing, said oil clutch brake unit comprising:

support means for supporting said clutch brake unit within said press;

input means for receiving rotary motion from said flywheel, said input means rotatable with respect to said support means;

output means for transmitting rotary motion from said clutch brake unit to said press shaft;

selectively operable clutch means for transmitting rotary motion from said input means to said output means, said clutch means including a plurality of interleaved friction disks;

selectively operable brake means for applying a braking action to said output means to inhibit rotary motion of said press shaft, said brake means including a plurality of interleaved friction disks; and first means for enabling fluid communication between said flywheel bearing and at least said clutch means to allow oil present within said flywheel bearing to access at least said clutch means.

5. The press as recited in claim 4, further comprising:

a slidable actuator plate disposed between said clutch means and said brake means, the operative sliding of said actuator plate selectively actuating one of said clutch means and said brake means; and at least one hydrostatic fluid bearing each disposed at a respective side of said actuator plate in facing opposition to at least one of said clutch means and said brake means.

6. The press as recited in claim 4, further comprising:

second means for selectively introducing fluid into said clutch brake unit to lubricate at least said clutch means, said second means being operable independently of said first means.

7. The press as recited in claim 4, wherein oil accessing said clutch means via said first means being effective in substantially eliminating free undamped clearances within said clutch means.

8. The press as recited in claim 7, further comprising:

a mount assembly including a plurality of mounting elements arranged to secure said clutch means to at least one of said input means and said flywheel, each one of said plurality of mounting elements having at least one free clearance space associated therewith which is substantially filled by oil accessing said clutch means via said first means.

9. A press in combination with an oil shear clutch brake unit, said press including a shaft and flywheel with an oil filled bearing, said oil clutch brake unit comprising:

support means for supporting said clutch brake unit within said press;

input means for receiving rotary motion from said flywheel, said input means rotatable with respect to said support means;

output means for transmitting rotary motion from said clutch brake unit to said press shaft;

selectively operable clutch means for transmitting rotary motion from said input means to said output means, said clutch means including a plurality of interleaved friction disks;

selectively operable brake means for applying a braking action to said output means to inhibit rotary motion of said press shaft, said brake means including a plurality of interleaved friction disks;

a housing to house said support means, said input means, said output means, said clutch means, and said brake means; and first means for enabling fluid communication between said flywheel bearing and at least said clutch means to allow oil present within said flywheel bearing to access at least said clutch means.

10. The press of claim 9 in which said oil filled flywheel bearing drains oil into said housing to lubricate said clutch means.

11. The press as recited in claim 9, further comprising:

a slidable actuator plate disposed between said clutch means and said brake means, the operative sliding of said actuator plate selectively actuating one of said clutch means and said brake means; and at least one hydrostatic fluid bearing each disposed at a respective side of said actuator plate in facing opposition to at least one of said clutch means and said brake means.

12. The press as recited in claim 9, further comprising:

second means for selectively introducing fluid into said clutch brake unit to lubricate at least said clutch means, said second means being operable independently of said first means.

13. The press as recited in claim 9, wherein oil accessing said clutch means via said first means being effective in substantially eliminating free undamped clearances within said clutch means.

14. The press as recited in claim 13, further comprising:

a mount assembly including a plurality of mounting elements arranged to secure said clutch means to at least one of said input means and said flywheel, each one of said plurality of mounting elements having at least one free clearance space associated therewith which is substantially filled by oil accessing said clutch means via said first means.

15. A press in combination with an oil shear clutch brake unit, said press including a shaft and flywheel with an oil filled bearing, said oil clutch brake unit comprising:

support means for supporting said clutch brake unit within said press;

input means for receiving rotary motion from said flywheel, said input means rotatable with respect to said support means;

output means for transmitting rotary motion from said clutch brake unit to said press shaft;

selectively operable clutch means for transmitting rotary motion from said input means to said output means;

selectively operable brake means for applying a braking action to said output means to inhibit rotary motion of said press shaft, said brake means including a plurality of interleaved friction disks;

a slidable actuator plate located between said clutch means and said brake means, the operative sliding of said actuator plate selectively actuating one of said brake means and said clutch means; and at least one hydrostatic fluid bearing each disposed at a respective side of said actuator Plate in facing opposition to at least one of said clutch means and said brake means.

16. The press as recited in claim 15, further comprising:

first means for enabling fluid communication between said flywheel bearing and at least said clutch means to allow oil present within said flywheel bearing to access at least said clutch means.

17. The press as recited in claim 16, further comprising:

second means for selectively introducing fluid into said clutch brake unit to lubricate at least said clutch means, said second means being operable independently of said first means.

18. The press as recited in claim 16, wherein oil accessing said clutch means via said first means being effective in substantially eliminating free undamped clearances within said clutch means.

19. The press as recited in claim 18, further comprising:

a mount assembly including a plurality of mounting elements arranged to secure said clutch means to at least one of said input means and said flywheel, each one of said plurality of mounting elements having at least one free clearance space associated therewith which is substantially filled by oil accessing said clutch means via said first means.

* * * * *